United States Patent
Choi et al.

(10) Patent No.: US 11,861,227 B2
(45) Date of Patent: Jan. 2, 2024

(54) STORAGE DEVICE WITH TASK SCHEDULER AND METHOD FOR OPERATING THE DEVICE

(71) Applicant: SAMSUNG ELECTRONICS CO., LTD., Suwon-si (KR)

(72) Inventors: Wan-Soo Choi, Hwaseong-si (KR); Young Wook Kim, Hwaseong-si (KR); Do Hyeon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 17/477,865

(22) Filed: Sep. 17, 2021

(65) Prior Publication Data

US 2022/0206714 A1 Jun. 30, 2022

(30) Foreign Application Priority Data

Dec. 29, 2020 (KR) .................. 10-2020-0185982

(51) Int. Cl.
*G06F 3/06* (2006.01)

(52) U.S. Cl.
CPC .......... *G06F 3/0659* (2013.01); *G06F 3/0604* (2013.01); *G06F 3/0679* (2013.01)

(58) Field of Classification Search
CPC .... G06F 3/0659; G06F 3/0604; G06F 3/0679; G06F 3/0611; G06F 3/061; G06F 9/3802; G06F 9/3814
See application file for complete search history.

(56) References Cited

U.S. PATENT DOCUMENTS

| | | | |
|---|---|---|---|
| 6,959,372 B1 | 10/2005 | Hobson et al. | |
| 8,234,431 B2 | 7/2012 | Kruglick | |
| 8,516,454 B2 | 8/2013 | Mizrachi et al. | |
| 8,782,645 B2 | 7/2014 | Breternitz et al. | |
| 10,649,781 B2* | 5/2020 | Altevogt | G06F 9/4881 |
| 10,824,425 B2* | 11/2020 | Okada | G06F 3/067 |
| 11,301,393 B2* | 4/2022 | Lee | G06F 12/1009 |
| 2015/0082314 A1 | 3/2015 | Suzuki | |
| 2021/0004179 A1 | 1/2021 | Choi et al. | |

FOREIGN PATENT DOCUMENTS

| | | |
|---|---|---|
| JP | 2010-079622 | 4/2010 |
| JP | 2011-233057 | 11/2011 |
| KR | 10-2014-0006351 | 1/2014 |

* cited by examiner

*Primary Examiner* — Idriss N Alrobaye
*Assistant Examiner* — Richard B Franklin
(74) *Attorney, Agent, or Firm* — F. Chau & Associates, LLC

(57) ABSTRACT

A method of operating a storage device including a non-volatile memory and a multi-core processor with at least two cores includes the following steps: receiving, by a host interface of the storage device, a first command from a host for requesting the non-volatile memory to perform a predetermined memory operation; generating, by a task scheduler of the storage device, first and second tasks from the first memory command; selecting, by the task scheduler, a first core from among the at least two cores based on execution times of the at least two cores; assigning, by the task scheduler, the first and second tasks to the first core; and requesting, by the first core, a subsequent task from the scheduler while the first core processes the first assigned task and loads code for processing the second task.

19 Claims, 10 Drawing Sheets

| Core ID | 1 | 2 | ... | N |
|---------|---|---|-----|---|
| ETS | E1 | E2 | ... | EN |

| TID | 1 | 2 | ... | M |
|-----|---|---|-----|---|
| TDT | T1 | T2 | ... | TM |

| TID | 1 | 2 | ... |
|---|---|---|---|
| TDT | 10 | 30 | ... |

FIG. 10
219b

| Core ID | 1 | 2 | 3 | 4 | ... |
|---|---|---|---|---|---|
| ETS | 20 | 100 | 80 | 210 | ... |

FIG. 11
219b

| Core ID | 1 | 2 | 3 | 4 | ... |
|---|---|---|---|---|---|
| ETS | 60 | 100 | 80 | 210 | ... |

| TID | 1 | 2 | ... | k |
|---|---|---|---|---|
| TDT | T1 | T2 | ... | Tk |

STORAGE DEVICE WITH TASK SCHEDULER AND METHOD FOR OPERATING THE DEVICE

CROSS-REFERENCE TO RELATED APPLICATION

This application claims priority under 35 U.S.C. § 119 to Korean Patent Application No. 10-2020-0185982 filed on Dec. 29, 2020 in the Korean Intellectual Property Office, the disclosure of which is incorporated by reference herein in its entirety.

TECHNICAL FIELD

The present disclosure relates to a storage device and method for operating the same. More particularly, the present disclosure relates to a storage device with increased operation speed and a method for operating the same.

DISCUSSION OF THE RELATED ART

Storage devices are used in electronic devices to store data. They may include volatile and/or non-volatile memory technologies. While volatile memory loses information contained therein once power is removed from the system, non-volatile memory retains the information even after power is removed. One example of commonly used non-volatile memory is flash memory. Flash memory is generally implemented in the form of floating-gate transistors, which are able to store data that may be quickly read.

There have been rapid changes in the operating environments of storage devices that include non-volatile memory. For example, many storage devices are components in a larger electronic system, such as a personal computer, where they interface with other components like multi-core processors. For such multi-core processor storage devices, it is helpful to increase the utilization of each core of the plurality of cores to achieve increased operating speeds in the storage device. Accordingly, there has been new research for storage devices capable of utilizing multi-core processors.

SUMMARY

Embodiments of the present disclosure include a method for operating a storage device capable of increasing an operating speed.

Embodiments of the present disclosure also include a storage device having an increased operating speed.

However, aspects of the present disclosure are not restricted to those set forth herein. The above and other aspects of the present disclosure will become more apparent to one of ordinary skill in the art to which the present disclosure pertains by referencing the detailed description given below.

Some embodiments of the present disclosure provide a method for operating a storage device that includes a non-volatile memory and a multi-core processor with at least two cores, where the method includes: receiving, by a host interface of the storage device, a first command from a host for requesting the non-volatile memory to perform a predetermined memory operation; generating, by a task scheduler of the storage device, first and second tasks from the first memory command; selecting, by the task scheduler, a first core from among the at least two cores based on execution times of the at least two cores; assigning, by the task scheduler, the first and second tasks to the first core; and requesting, by the first core, a subsequent task from the scheduler while the first core processes the first assigned task and loads code for processing the second task.

Some embodiments of the present disclosure provide method for operating a storage device that includes a non-volatile memory and a multi-core processor with at least two cores, where the method includes: receiving, by a host interface of the storage device, a first command from a host for requesting the non-volatile memory to perform a predetermined memory operation; generating, by a task scheduler of the storage device, a first task based on the first memory command; checking an execution time of the first task by the task scheduler; selecting, by the task scheduler, a first core from among the at least two cores based on the execution times of the at least two cores, wherein the execution times of the at least two cores are based on the execution time of the first task, as a core to which the first task is assigned; updating, by the task scheduler, the execution time of the first core in consideration of the execution time of the first task; issuing, by the task scheduler the first task to the first core; and providing, by the storage controller, a second memory command, based at least in part on the first memory command generated after completion of processing of the first task, to the non-volatile memory through the memory interface.

Some embodiments of the present disclosure provide a storage device including: a non-volatile memory including a plurality of non-volatile memory cells; a host interface which receives a first memory command for requesting the non-volatile memory to perform a predetermined memory operation from a host; a multi-core processor including a plurality of cores; a task scheduler which generates a plurality of tasks from the first memory command, and selects a core that processes the plurality of tasks, using a task execution time table in which processing times of each of the plurality of tasks are stored, and an execution time stamp table in which execution times of each of the plurality of cores are stored; and a memory interface which outputs a second memory command corresponding to the first memory command generated based on the plurality of tasks processed by the plurality of cores to the non-volatile memory.

Other features and embodiments may be apparent from the following detailed description, the drawings and the claims.

BRIEF DESCRIPTION OF THE DRAWINGS

The above and other aspects and features of the present disclosure will become more apparent by describing in detail embodiments thereof while referring to the attached drawings, in which.

DETAILED DESCRIPTION OF THE EMBODIMENTS

Hereinafter, embodiments will be described in detail with reference to the accompanying drawings. Like reference symbols in the drawings may denote like elements, and to the extent that a description of an element has been omitted, it may be understood that the element is at least similar to corresponding elements that are described elsewhere in the specification.

Figure 1:
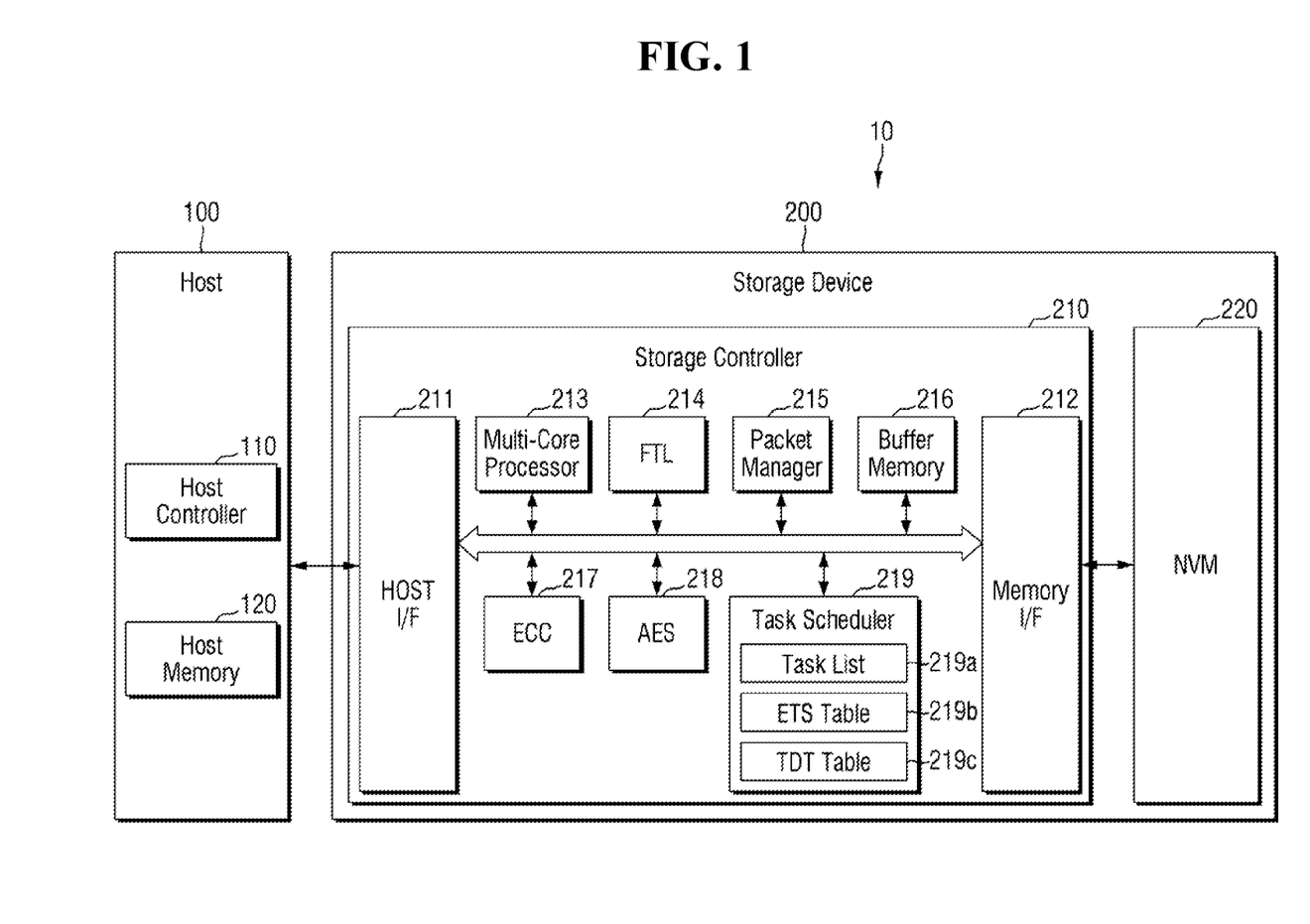
FIG. 1 is a block diagram showing a host-storage system according to some embodiments.

FIG. 1 is a block diagram showing a host-storage system according to some embodiments.

A host-storage system 10 may include a host 100 and a storage device 200. The storage device 200 may also include a storage controller 210 and a non-volatile memory (NVM) 220. The host 100 may include a host controller 110 and a host memory 120. The host memory 120 may function as a buffer memory for temporarily storing data to be transmitted to the storage device 200 or data that is transmitted from the storage device 200.

The storage device 200 may include storage medium for storing data in response to a request from the host 100. For example, the storage device 200 may include at least one of an SSD (Solid State Drive), an embedded memory, and a detachable external memory. If the storage device 200 is an SSD, the storage device 200 may be a device that complies with a NVMe (non-volatile memory express) standard.

If the storage device 200 is an embedded memory or an external memory, the storage device 200 may be a device that complies with a UFS (universal flash storage) or an eMMC (embedded multi-media card) standard. The host 100 and the storage device 200 may each generate and transmit packets according to the adopted standard protocol.

When the non-volatile memory 220 of the storage device 200 includes a flash memory, the flash memory may include a 2D NAND memory array or a 3D (or vertical) NAND (VNAND) memory array. As another example, the storage device 200 may also include other various types of non-volatile memories. For example, the storage device 200 may include a MRAM (Magnetic RAM), a MRAM (Spin-Transfer Torque MRAM), a conductive bridging RAM (CBRAM), a FeRAM (Ferroelectric RAM), a PRAM (Phase RAM), a resistive memory (Resistive RAM), and/or other various types of memories.

In some embodiments, the host controller 110 and the host memory 120 may be implemented as different semiconductor chips. In some embodiments, the host controller 110 and the host memory 120 may be integrated on the same semiconductor chip. As an example, the host controller 110 may be one of a plurality of modules provided in an application processor, and such an application processor may be implemented as a system on chip (SoC). Further, the host memory 120 may be an embedded memory provided in the application processor, or a non-volatile memory, or a memory module placed outside of the application processor.

The host controller 110 may manage operations including storing the data (e.g., write data) of a buffer region in the non-volatile memory 220 and/or storing the data (e.g., read data) of the non-volatile memory 220 in the buffer region.

The storage controller 210 may include a host interface 211, a memory interface 212, and a multi-core processor 213. The storage controller 210 may further include a flash translation layer (FTL) 214, a packet manager 215, a buffer memory 216, an ECC (error correction code) engine 217, an AES (advanced encryption standard) engine 218, and a task scheduler 219.

The storage controller 210 may further include a working memory into which the flash conversion layer (FTL) 214 is loaded, and when the multi-core processor 213 executes the flash conversion layer 214, the data write and read operations on the non-volatile memory may be controlled.

The host interface 211 may transmit and receive packets to and from the host 100. Packets transmitted from the host 100 to the host interface 211 may include commands and/or data to be written to the non-volatile memory 220, and packets transmitted from the host interface 211 to the host 100 may include responses to the commands, and/or data that is read from the non-volatile memory 220, and the like.

The memory interface 212 may transmit the data to be written on the non-volatile memory 220 to the non-volatile memory 220, and/or receive the read data from the non-volatile memory 220. Such memory interface 212 may be implemented to comply with standard conventions such as Toggle or ONFI.

The flash translation layer 214 may perform various functions such as address mapping, wear-leveling, and garbage collection. The address mapping operation may include changing a logical address received from a host into a physical address which is used for actually storing the data in the non-volatile memory 220. The wear-leveling may include ensuring that blocks in the non-volatile memory 220 are used uniformly to prevent an excessive degradation of a particular block, and may be implemented, for example, through a firmware capable of balancing the erasure counts of the physical blocks. The garbage collection may include ensuring an available capacity in the non-volatile memory 220 through a method of copying the valid data of the block to a new block and then erasing the existing block.

The packet manager 215 may generate a packet according to the protocol of the interface discussed with the host 100, and/or may parse various types of information from the packet received from the host 100. Further, in some embodiments, the packet manager 215 may manage a packet provided from the task scheduler 219 to the multi-core processor 213 or a packet provided from the multi-core processor 213 to the task scheduler 219. However, the embodiments are not necessarily limited thereto.

The buffer memory 216 may temporarily store data to be recorded on the non-volatile memory 220, or data to be read from the non-volatile memory 220. The buffer memory 216 may be provided inside of the storage controller 210, or may be placed outside of the storage controller 210.

The ECC engine 217 may perform error detection and correction functions of the read data from the non-volatile memory 220. More specifically, the ECC engine 217 may generate parity bits on the write data to be written to the non-volatile memory 220, and the parity bits generated in this way may be stored in the non-volatile memory 220 together with the write data. When reading the data from the non-volatile memory 220, the ECC engine 217 may correct an error of the read data and output the read data with a corrected error, using the parity bits that are read from the non-volatile memory 220 together with the read data.

The AES engine 218 may perform encryption and/or decryption operations of the data which are input to the storage controller 210 by, for example, using a symmetric-key algorithm.

Figure 2:
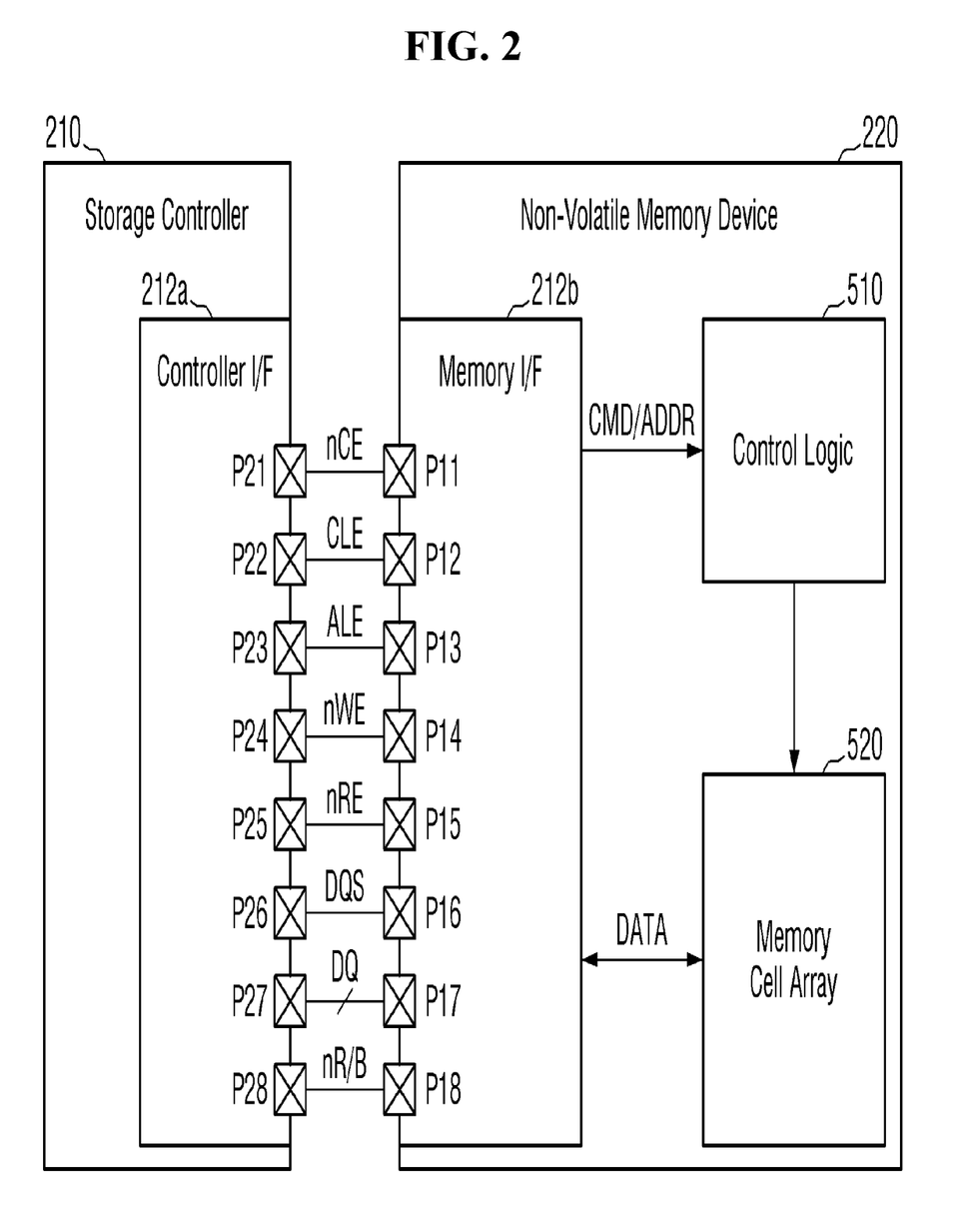
FIG. 2 is a diagram in which a storage controller, a memory interface, and a non-volatile memory of FIG. 1 are reconfigured.

FIG. 2 is a diagram in which the storage controller, the memory interface, and the non-volatile memory of FIG. 1 are reconfigured. The memory interface 212 of FIG. 1 may include a controller interface circuit 212a and a memory interface circuit 212b of FIG. 2.

The non-volatile memory 220 may include first to eight pins P11 to P18, a memory interface circuit 212b, a control logic circuit 510, and a memory cell array 520.

The memory interface circuit 212b may receive a chip enable signal nCE from the storage controller 210 through the first pin P11. The memory interface circuit 212b may transmit and receive signals to and from the storage controller 210 through second to eighth pins P12 to P18 based at least in part on the chip enable signal nCE. For example, when the chip enable signal nCE is in an enable state (e.g., a low level), the memory interface circuit 212b may transmit and receive signals to and from the storage controller 210 through second to eighth pins P12 to P18.

The memory interface circuit 212b may receive a command latch enable signal CLE, an address latch enable signal ALE, and a write enable signal nWE from the storage controller 210 through second to fourth pins P12 to P14, respectively. The memory interface circuit 212b may receive a data signal DQ from the storage controller 210 or transmit the data signal DQ to the storage controller 210 through a seventh pin P17. The command CMD, the address ADDR, and the data DATA may be transferred through the data signal DQ. For example, the data signal DQ may be transferred through a plurality of data signal lines. In this case, the seventh pin P17 may include a plurality of pins corresponding to the plurality of data signals.

The memory interface circuit 212b may acquire the command CMD from the data signal DQ received in an enable section (e.g., a high level state) of the command latch enable signal CLE based on the toggle timings of the write enable signal nWE. The memory interface circuit 212b may acquire the address ADDR from the data signal DQ received in the enable section (e.g., a high level state) of the address latch enable signal ALE based on the toggle timings of the write enable signal nWE.

In some embodiments, the write enable signal nWE may hold a static state (e.g., a high level or a low level) and then may be toggled between the high level and the low level. For example, the write enable signal nWE may be toggled at a section in which the command CMD or the address ADDR is transmitted. Accordingly, the memory interface circuit 212b may acquire the command CMD or the address ADDR based on the toggle timings of the write enable signal nWE.

The memory interface circuit 212b may receive a read enable signal nRE from the storage controller 210 through a fifth pin P15. The memory interface circuit 212b may receive the data strobe signal DQS from the storage controller 210 through a sixth pin P16, or may transmit the data strobe signal DQS to the storage controller 210.

In the data DATA output operation of the non-volatile memory 220, the memory interface circuit 212b may receive the toggled read enable signal nRE through the fifth pin P15 before outputting the data DATA. The memory interface circuit 212b may generate the toggled data strobe signal DQS based on the toggling of the read enable signal nRE. For example, the memory interface circuit 212b may generate the data strobe signal DQS that starts toggling after a predetermined delay (e.g., tDQSRE) based on the toggling start time of the read enable signal nRE. The memory interface circuit 212b may transmit a data signal DQ including the data DATA based on the toggle timing of the data strobe signal DQS. As a result, the data DATA may be aligned with the toggle timing of the data strobe signal DQS and transmitted to the storage controller 210.

In the data DATA input operation of the non-volatile memory 220, if the data signal DQ including the data DATA is received from the storage controller 210, the memory interface circuit 212b may receive the toggled data strobe signal DQS together with the data DATA from the storage controller 210. The memory interface circuit 212b may acquire the data DATA from the data signal DQ based on the toggle timing of the data strobe signal DQS. For example, the memory interface circuit 212b may acquire the data DATA by sampling the data signal DQ at a rising edge and a falling edge of the data strobe signal DQS.

The memory interface circuit 212b may transmit a ready/busy output signal nR/B to the storage controller 210 through an eighth pin P18. The memory interface circuit 212b may transmit the state information of the non-volatile memory 220 to the storage controller 210 through the ready/busy output signal nR/B. If the non-volatile memory 220 is in the busy state (for example, when the internal operations of the non-volatile memory 220 are being performed), the memory interface circuit 212b may transmit the ready/busy output signal nR/B indicating the busy state to the storage controller 210. If the non-volatile memory 220 is in the ready state (for example, the internal operations of the non-volatile memory 220 are not performed or are completed), the memory interface circuit 212b may transmit the ready/busy output signal nR/B indicating the ready state to the storage controller 210.

For example, while the non-volatile memory 220 reads the data DATA from the memory cell array 520 in response to a page read command, the memory interface circuit 212b may transmit the ready/busy output signal nR/B indicating the busy state (e.g., a low level) to the storage controller 210. For example, while the non-volatile memory 220 programs the data DATA into the memory cell array 520 in response to the program instruction, the memory interface circuit 212b may transmit the ready/busy output signal nR/B indicating the busy state to the storage controller 210.

The control logic circuit 510 may control various operations of the non-volatile memory 220. The control logic circuit 510 may receive the command/address CMD/ADDR acquired from the memory interface circuit 212b. The control logic circuit 510 may generate control signals for controlling other components of the non-volatile memory 220 based at least in part on the received command/address CMD/ADDR. For example, the control logic circuit 510 may generate various control signals for programing the data DATA in the memory cell array 520 or reading the data DATA from the memory cell array 520.

The memory cell array 520 may store the data DATA acquired from the memory interface circuit 212b based at least in part on the control of the control logic circuit 510. The memory cell array 520 may output the stored data DATA to the memory interface circuit 212b based at least in part on the control of the control logic circuit 510.

The memory cell array 520 may include a plurality of memory cells. In one embodiment, a plurality of memory cells may be flash memory cells. However, the present disclosure is not necessarily limited thereto, and the memory cells may be a RRAM (Resistive Random Access Memory) cell, a FRAM (Ferroelectric Random Access Memory) cell, a PRAM (Phase Change Random Access Memory) cell, a TRAM (Thyristor Random Access Memory) cell, and/or a MRAM (Magnetic Random Access Memory) cell. Hereinafter, embodiments of the present disclosure will be described according to an example in which the memory cells are NAND flash memory cells.

The storage controller 210 may include first to eighth pins P21 to P28, and a controller interface circuit 212a. The first to eighth pins P21 to P28 may correspond to the first to eighth pins P11 to P18 of the non-volatile memory 220. For example, the first to eight pins P21 to P28 of the storage controller 210 may be respectively connected to the first to eight pins P11 to P18 of the non-volatile memory 220.

The controller interface circuit 212a may transmit the chip enable signal nCE to the non-volatile memory 220 through a first pin P21. The controller interface circuit 212a may transmit and receive signals to and from the non-volatile memory 220, which is selected through the chip enable signal nCE, through the second to eighth pins P22 to P28.

The controller interface circuit 212a may transmit the command latch enable signal CLE, the address latch enable signal ALE, and the write enable signal nWE to the non-volatile memory 220 through the second to fourth pins P22 to P24, respectively. The controller interface circuit 212a may transmit the data signal DQ to the non-volatile memory 220 or receive the data signal DQ from the non-volatile memory 220 through a seventh pin P27.

The controller interface circuit 212a may transmit the data signal DQ including the command CMD or the address ADDR to the non-volatile memory 220 along with the toggled enable signal nWE. The controller interface circuit 212a may transmit the data signal DQ including the command CMD to the non-volatile memory 220 by transmitting the command latch enable signal CLE in the enable state, and may transmit the data signal DQ including the address ADDR to the non-volatile memory 220 by transmitting the address latch enable signal ALE in the enable state.

The controller interface circuit 212a may transmit the read enable signal nRE to the non-volatile memory 220 through the fifth pin P25. The controller interface circuit 212a may receive the data strobe signal DQS from the non-volatile memory 220 through the sixth pin P26, and/or may transmit the data strobe signal DQS to the non-volatile memory 220.

In the data DATA output operation of the non-volatile memory 220, the controller interface circuit 212a may generate a toggling read enable signal nRE and transmit the read enable signal nRE to the non-volatile memory 220. For example, the controller interface circuit 212a may generate the read enable signal nRE that changes from the static state (e.g., a high level or a low level) to the toggle state before the data DATA is output. As a result, the toggled data strobe signal DQS may be generated in the non-volatile memory 220 based on the read enable signal nRE. The controller interface circuit 212a may receive the data signal DQ including the data DATA along with the toggled data strobe signal DQS from the non-volatile memory 220. The controller interface circuit 212a may acquire the data DATA from the data signal DQ based on the toggle timing of the data strobe signal DQS.

In the data DATA input operation of the non-volatile memory 220, the controller interface circuit 212a may generate a toggled data strobe signal DQS. For example, the controller interface circuit 212a may generate the data strobe signal DQS that changes from the static state (e.g., a high level or a low level) to the toggle state before transmitting the data DATA. The controller interface circuit 212a may transmit the data signal DQ including the data DATA to the non-volatile memory 220 based on the toggle timings of the data strobe signal DQS.

The controller interface circuit 212a may receive a ready/busy output signal nR/B from the non-volatile memory 220 through an eighth pin P28. The controller interface circuit 212a may determine the state information of the non-volatile memory 220 based on the ready/busy output signal nR/B.

Figure 3:
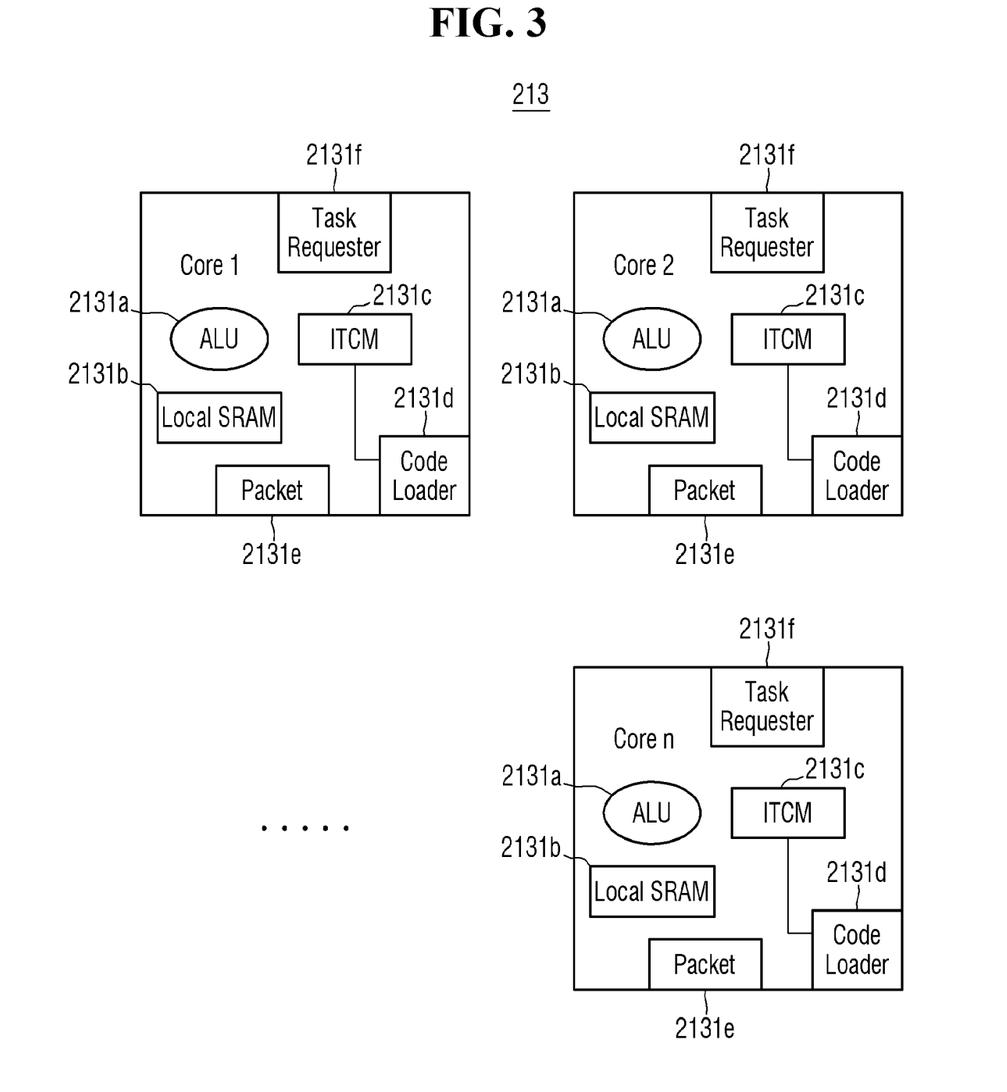
FIG. 3 is a diagram showing a multi-core processor of FIG. 1.
Figure 4:
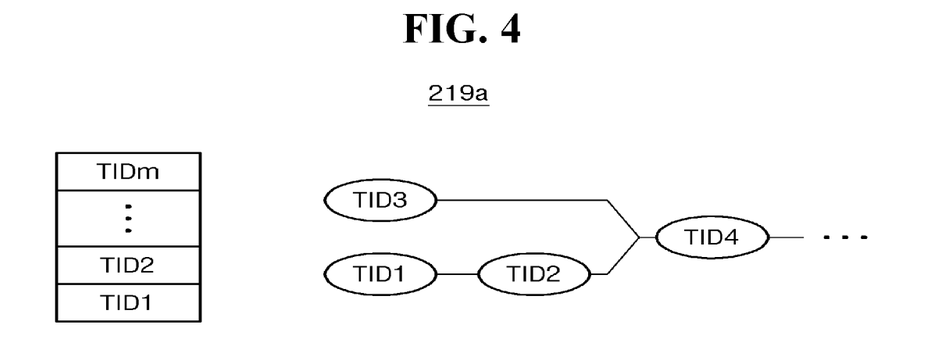
FIG. 4 is a diagram showing a task list of FIG. 1.
Figure 5:
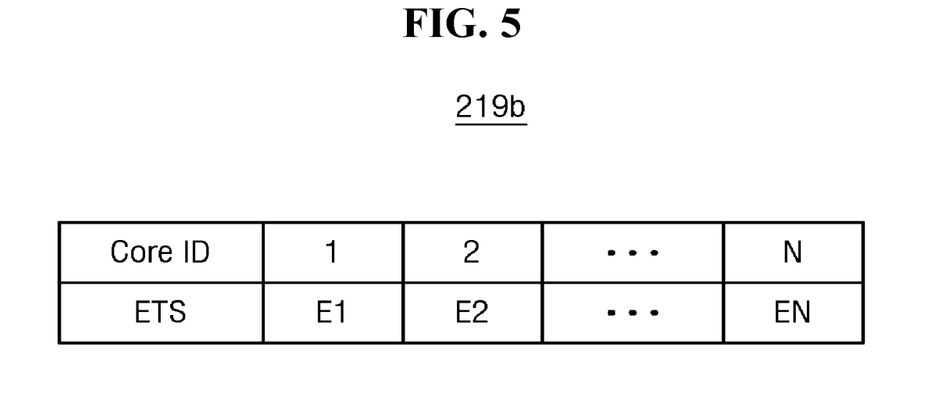
FIG. 5 is a diagram showing an ETS (Execution Time Stamp) table of FIG. 1.
Figure 6:
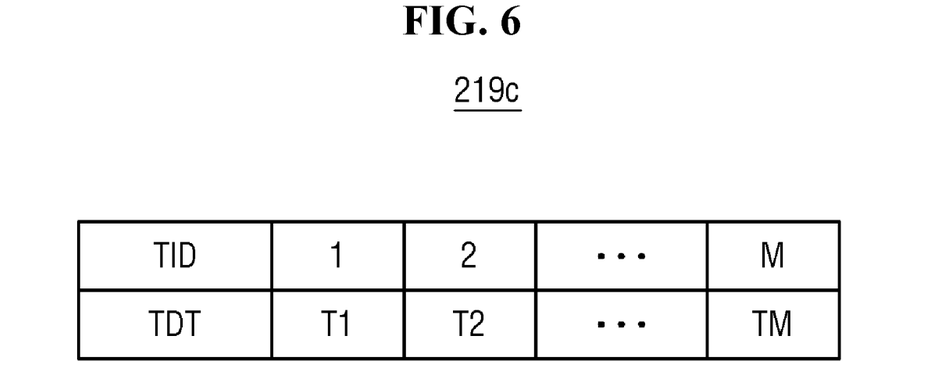
FIG. 6 is a diagram showing a TDT (Task Duration Time) table of FIG. 1.

FIG. 3 is a diagram showing the multi-core processor of FIG. 1. FIG. 4 is a diagram showing a task list of FIG. 1. FIG. 5 is a diagram showing an ETS (Execution Time Stamp) table of FIG. 1. FIG. 6 is a diagram showing a TDT (Task Duration Time) table of FIG. 1.

Referring to FIGS. 1 and 3, the multi-core processor 213 may include n cores, where n is a natural number greater than or equal to 2.

Each core may include a calculation unit 2131a, a SRAM 2131b, and an ITCM (Instruction Tightly Coupled Memory) 2131c. In some embodiments, each core may further include a code loader 2131d, a packet receiver 2131e, and a task requester 2131f.

The calculation unit 2131a may perform calculation based at least in part on code loaded into the ITCM 2131c. The SRAM 231b may store the data required to perform such a calculation.

The code loader 2131d may receive the code of the task to be performed by the core from an external source and load the code into the ITCM 2131c. The packet receiver 2131e may receive packets related to the operation of the core from an external source. The task requester 2131f may transmit a signal requesting a subsequent task, when the processing of the task issued to the core is completed.

Although FIG. 3 shows that each core includes the code loader 2131d, the packet receiver 2131e, and the task requester 2131f, the disclosure is not necessarily limited thereto. In some embodiments, the embodiments may be implemented in such a way that the code loader 2131d, the packet receiver 2131e and the task requester 2131f are implemented, for example, in software to control each core. Also, in some embodiments, the code loader 2131d, the packet receiver 2131e and the task requester 2131f may be implemented separately from the core.

Referring to FIG. 1 again, the task scheduler 219 may generate tasks required to generate the commands to be provided to the non-volatile memory 220 in response to the commands received through the host interface 211, and may operate such that the generated tasks are processed through the multi-core processor 213.

Specifically, the task scheduler 219 may generate a plurality of tasks from commands received through the host interface 211, and select a core for processing a plurality of tasks by the use of a task execution time table 219b and an execution time stamp table 219c, thereby allowing the tasks to be processed through the multi-core processor 213. The commands generated by processing a plurality of tasks may be provided to the non-volatile memory 220 in a manner as described above referring to FIG. 2, The task scheduler 219 may operate, using a task list 219a, an execution time stamp (ETS) table 219b, and a task execution time (TDT) table 219c.

Referring to FIGS. 1 and 4, the task list 219a may include m tasks, where m is a natural number, required to generate commands to be provided to the non-volatile memory 220 in response to commands received from the host 100 through the host interface 211. Here, the respective tasks may be distinguished from each other through an ID (TID), and may be dependent on each other.

For example, task 2 (TID 2) is a task that may be processed when task 1 (TID 1) is completed, and task 4 (TID 4) may be a task that may be processed when all tasks 1 to 3 (TID 1 to TID 3) are completed.

Referring to FIGS. 1 and 5, the ETS table 219b may include the execution times E1 to EN of each core included in the multi-core processor 213 at a specific time point. The task scheduler 219 may check the execution times E1 to EN of each core included in the multi-core processor 213 at a specific time point, by referring to the ETS table 219b.

Referring to FIGS. 1 and 6, the TDT table 219c may include the required time required for completion for each of the tasks TID 1 to TIDM stored in the task list 219a. In FIG. 6, task 1 (TID 1) instructs that T1 time is required to complete the processing and task 2 (TID 2) requires T2 time to complete the processing.

In some embodiments, the task scheduler 219 may be implemented, for example, in software to schedule tasks in each core included in the multi-core processor 213. In this case, the task list 219a, the ETS table 219b, and the TDT table 219c described above may be stored in the buffer memory 216 shown in FIG. 1, an internal memory of a storage controller 210, or an external memory of the storage controller 210.

Hereinafter, the operation of the storage device according to some embodiments will be described referring to FIGS. 7 to 15.

Figure 7:
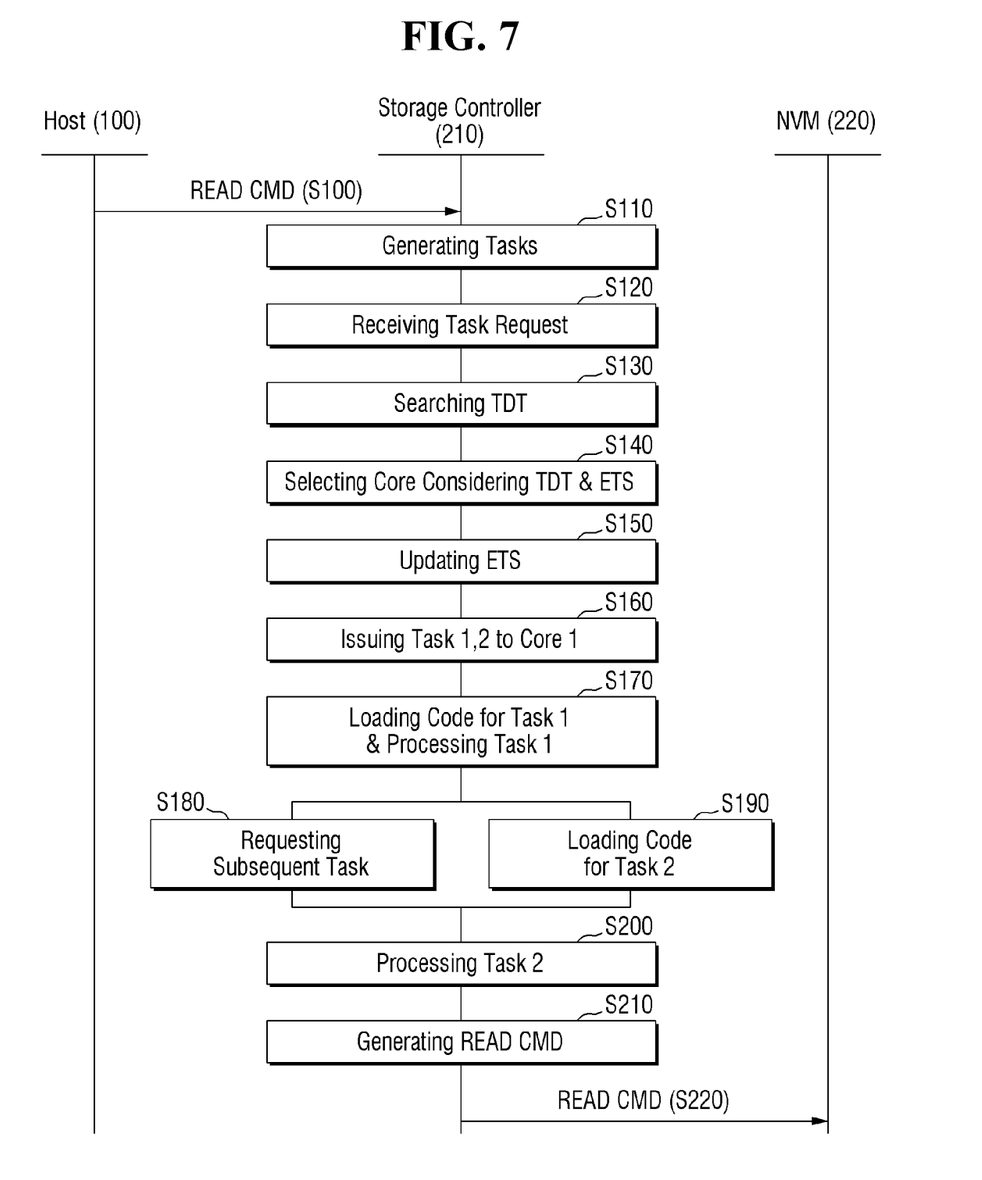
FIG. 7 is a flowchart showing operation of a storage device according to some embodiments.

FIG. 7 is a flowchart showing the operation of the storage device according to some embodiments. FIGS. 8 to 15 are diagrams for explaining the operation of the storage device according to some embodiments.

Referring to FIG. 7, the memory command is provided to the storage controller from the host (S100).

Figure 8:
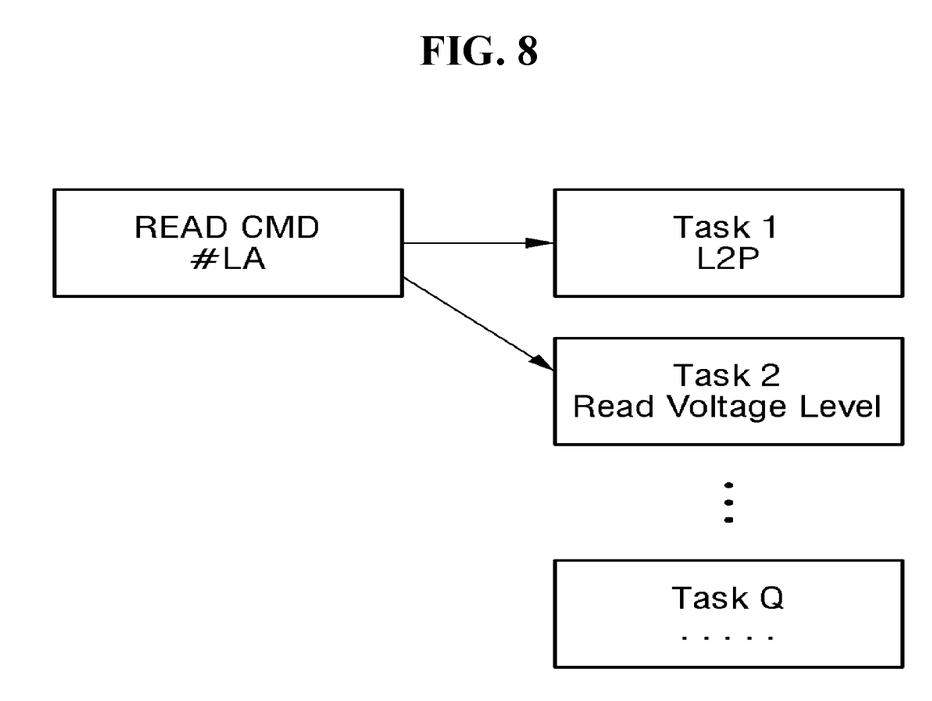
FIGS. 8 to 15 are diagrams for explaining the operation of the storage device according to some embodiments.

Specifically, referring to FIGS. 1 and 8, the host interface 211 may receive a memory command that requires execution of the memory operation on the non-volatile memory 220.

For example, the memory operation may include an operation of reading the data stored in the non-volatile memory cell of the non-volatile memory 220 addressed to a logical address, a write operation of writing the data to a non-volatile memory cell of the non-volatile memory 220 addressed to the logical address, and/or an erase operation of erasing a specific block of the non-volatile memory 220 addressed to the logical address. However, the embodiments are not necessarily limited thereto, and the examples of the memory operation of the non-volatile memory 220 may be modified in various ways.

Hereinafter, a read command for requesting to read the data stored in the non-volatile memory cell of the non-volatile memory 220 addressed to the logical address will be explained as an example. However, it will be appreciated that the embodiments are not limited to this example.

Next, tasks corresponding to the provided read commands are generated (S110).

Specifically, referring to FIGS. 1 and 8, the task scheduler 219 of the storage controller 210 may generate the tasks required to generate the read command to be transmitted to the non-volatile memory 220 in response to the read command provided from the host 100.

As an example, the first task (Task 1) may include an address mapping (L2P) task of mapping a logical address LA, which is provided from the host 100, to a physical address (PA) used in the non-volatile memory 220, and the second task (Task 2) may include determining the level of read voltage applied to the non-volatile memory cell of the non-volatile memory 220.

This is only one example, however, and the task scheduler 219 may generate Q (Q is a natural number) tasks required for generating the read command to be transmitted to the non-volatile memory 220 in response to the read command provided from the host 100.

Next, referring to FIG. 7, the task request is received (S120).

Specifically, referring to FIG. 1, the task scheduler 219 of the storage controller 210 may receive a test request of requesting assignment of the test from the core of the multi-core processor 213 in which the processing of the assigned task is completed.

Next, referring to FIG. 7, the task execution time is searched (S130).

Figure 9:
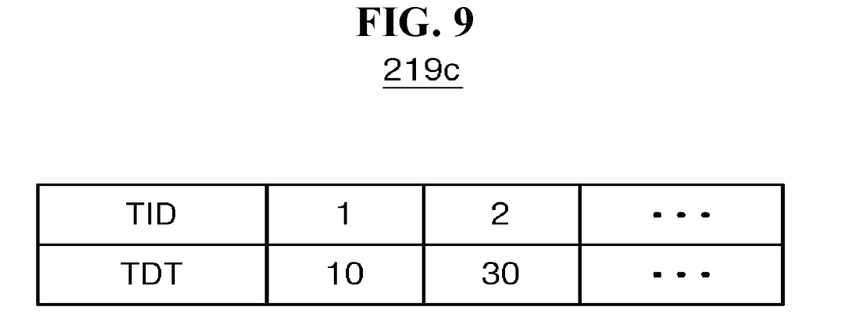

Specifically, referring to FIGS. 1 and 9, the task scheduler 219 of the storage controller 210 may extract tasks that need to be assigned from the task list (219a of FIG. 4) in consideration of the dependency between the respective tasks. Hereinafter, a case where the task scheduler 219 extracts task 1 (TID 1) and task 2 (TID 2) will be described as an example. However, the embodiments are not necessarily limited thereto, and various tasks may be extracted according to different embodiments and/or operations.

The task scheduler 219 checks the execution time of task 1 (TID 1) and task 2 (TID 2) in the TDT table 219c. In the example shown in FIG. 9, the task scheduler 219 checks that the execution times of task 1 (TID 1) and task 2 (TID 2) are 40.

Next, referring to FIG. 7, the core is selected in consideration of the task execution time table and the execution time stamp table (S140).

Figure 10:
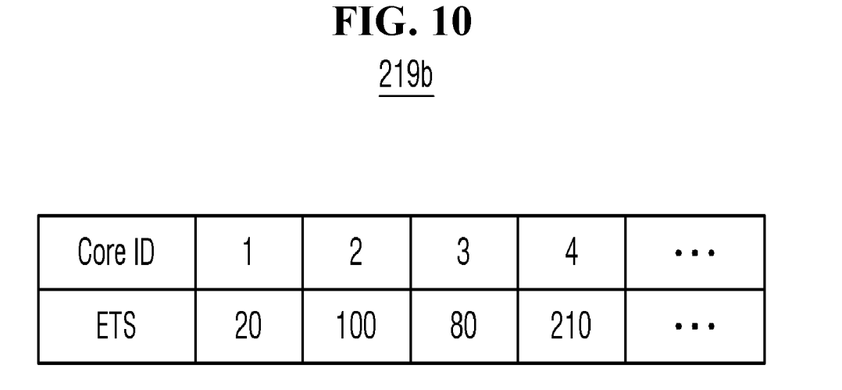

Specifically, referring to FIGS. 1 and 10, the task scheduler 219 checks the ETS table 219b and checks that the execution time of core 1 is the shortest at the present time point. If, for example, task 2 (TID 2) has a dependency on task 1 (TID 1), the task scheduler 219 may assign both task 1 (TID 1) and task 2 (TID 2) to core 1 having the shortest execution time at the present time point.

If, for example, there is no dependency between task 2 (TID 2) and task 1 (TID 1), the task scheduler 219 recalculates the execution time for each core, assuming that task 1 (TID 1) is assigned to core 1 having the shortest execution time at the present time point. Task 2 (TID 2) may also be assigned to the core having the shortest execution time. For example, Task 2 may be assigned core 1, or to another core other than core 1.

In this example, after task 1 (TID 1) is assigned to core 1, the execution time of core 1 becomes 30, which is the lowest value among the execution times of other cores. Therefore, the task scheduler 219 may assign both task 1 (TID 1) and task 2 (TID 2) to core 1.

Next, referring to FIG. 7, the ETS table is updated (S150).

It will be appreciated that various components described herein, such as the task scheduler 219, the packet manager 215, packet receiver 2131e, task requester 2131f, and code loader 2131d may be implemented as individual circuits. Additionally or alternatively, one or more of the components may be implemented within one or more processors configured to execute their described functionality.

Figure 11:
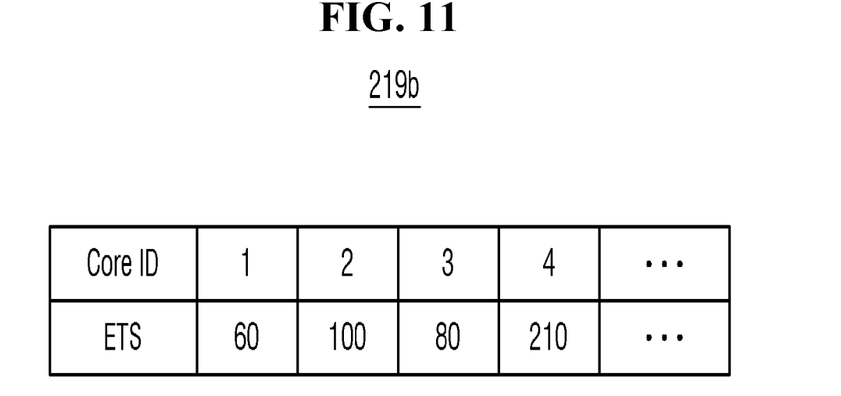

Specifically, referring to FIGS. 1 and 11, the task scheduler 219 updates the execution time of core 1, to which task 1 (TID 1) and task 2 (TID 2) are assigned, to 60.

Next, referring to FIG. 7, task 1 and task 2 are issued to core 1 (S160).

Figure 12:
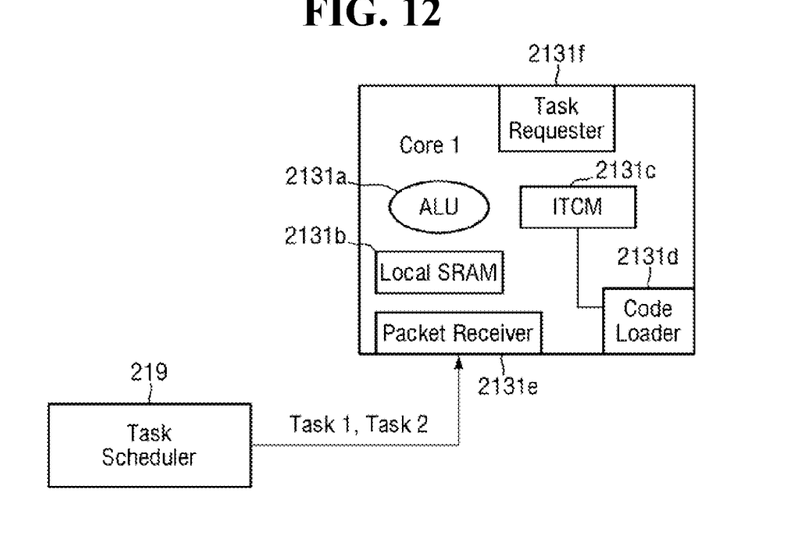

Specifically, referring to FIGS. 1 and 12, the task scheduler 219 provides task 1 (TID 1) and task 2 (TID 2) to the packet receiver 2131e of core 1 to issue task 1 (TID 1) and task 2 (TID 2) to core 1.

Next, referring to FIG. 7, the code required to process task 1 (TID 1) is loaded (S170).

Figure 13:
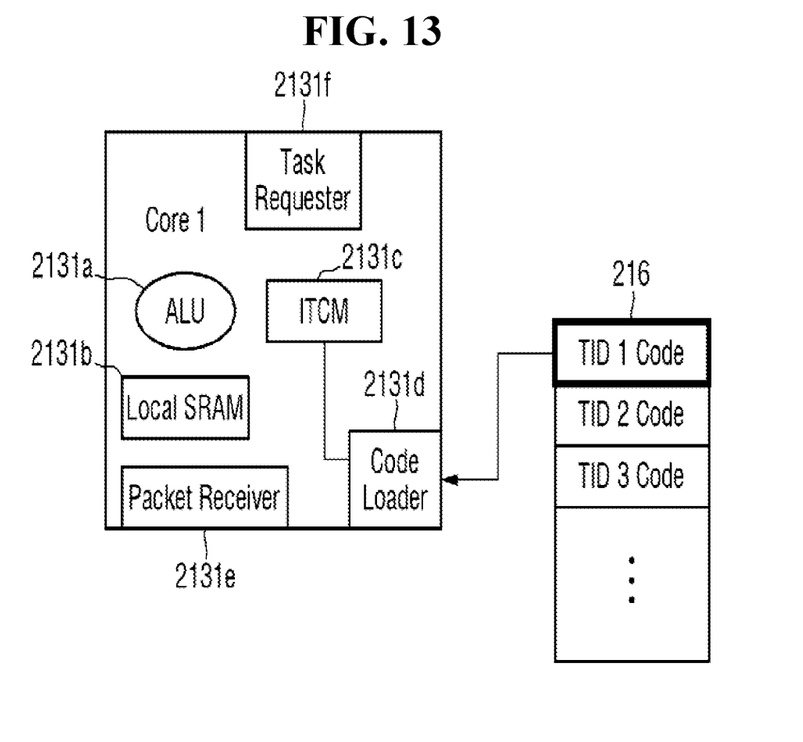

Specifically, referring to FIGS. 1 and 13, the code loader 2131d of the core 1 receives the code of the task 1 (TID 1)

to be processed by the core 1 from an external component, and may load the code into the ITCM 2131*c*. In some embodiments, although the codes required to process the task may be stored, for example, in the buffer memory 216 described above, the embodiments are not necessarily limited thereto.

When the code of task 1 (TID 1) is loaded into the ITCM 2131*c*, core 1 processes task 1 (TID 1), using the calculation unit 2131*a* and the SRAM 231*b*.

Next, referring to FIG. 7, when the processing of task 1 (TID 1) is completed, a request for a subsequent task is transmitted (S180). Further, the code required to process task 2 (TID 2) is loaded (S190).

Figure 14:
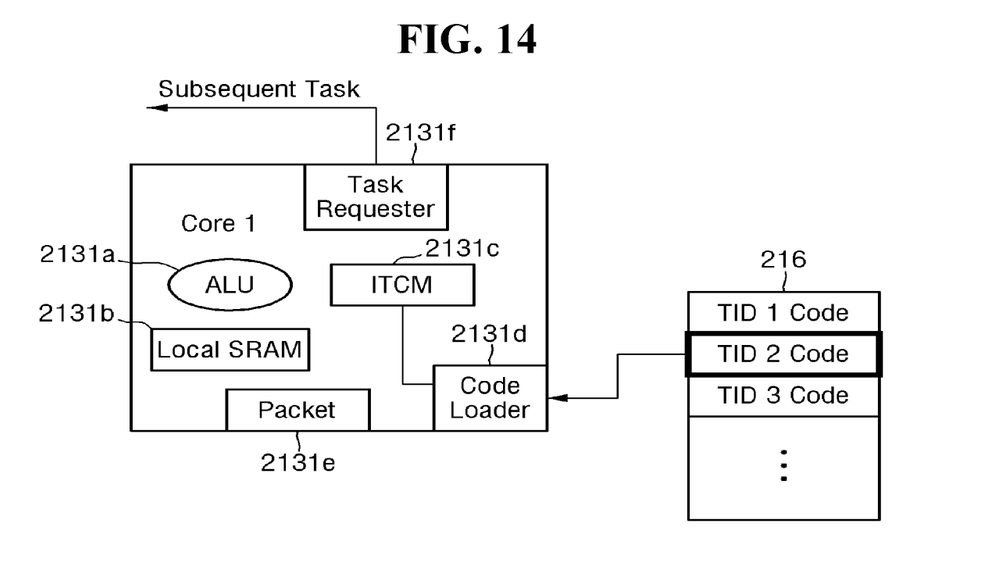

Specifically, referring to FIGS. 1 and 14, when processing of the task 1 (TID 1) is completed, the task requester 2131*f* of the core 1 requests the task scheduler 219 to assign the subsequent task (for example, a yet-to-be-determined task other than task 1 or task 2). Further, while the task requester 2131*f* requests the task scheduler 219 to assign the subsequent task, for example, the code loader 2131*d* of core 1 receives the code of task 2 (TID 2) to be processed by core 1 from the buffer memory 216, and loads the code into the ITCM 2131*c*. For example, the code loader 2131*d* of core 1 may not load the code required to perform the task after waiting for the timing when a new task is issued, but may rather load the code of the task scheduled to process while the task requester 2131*f* requests the task scheduler 219 to assign the subsequent task. Accordingly, the operation speed of the storage device may be increased.

Next, referring to FIG. 7, the task 2 (TID 2) is processed (S200).

Specifically, referring to FIGS. 1 and 14, when the code of task 2 (TID 2) is loaded into the ITCM 2131*c*, core 1 processes task 2 (TID 2), using the calculation unit 2131*a* and SRAM 2131*b*.

Next, referring to FIG. 7, a read command to be provided to the non-volatile memory is generated based on the processing results of the tasks (S210).

Figure 15:
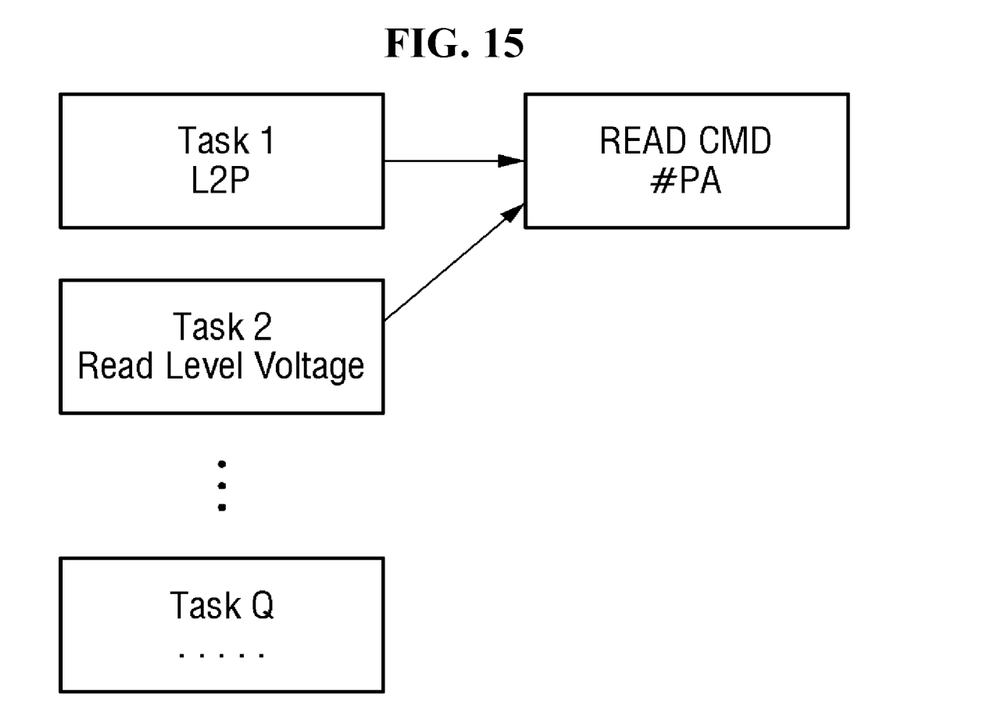

Specifically, referring to FIGS. 1 and 15, the storage controller 210 may check the physical address corresponding to the logical address provided from the host 100 based on the processing result of task 1 (TID 1), determine the read voltage level based on the processing result of task 2 (TID 2), and generate a read command to be provided to the non-volatile memory 220. At this time, the read command provided from the storage controller 210 to the non-volatile memory 220 may include a physical address and read voltage level information, unlike the read command provided from the host 100 to the storage controller 210.

The above description is directed towards one example embodiment, however, and the storage controller 210 may generate a read command provided from the storage controller 210 to the non-volatile memory 220 based on the processing results of Q tasks.

Next, referring to FIG. 7, the generated read command is transmitted to the non-volatile memory (S220).

The storage controller 210 may provide the generated read command to the non-volatile memory 220 in a manner described above with reference to FIG. 2. Specifically, the storage controller 210 may transmit the data signal (DQ of FIG. 2) including the generated read command and the generated physical address along with the toggled write enable signal (nWE of FIG. 2) to the non-volatile memory 220.

In the storage device 200 according to the present embodiment described above, each time the task scheduler 219 assigns the task, the execution time of each core is accounted for, and the task is assigned to the core capable of most efficiently processing the task. Also, each core does not maintain an idle state after processing the issued task until the next task is issued, but rather the code loading of the task scheduled to process is performed together at that core while requesting the task scheduler 219 to perform the subsequent tasks. Therefore, the usage efficiency of the core may be significantly increased, and the operating speed of the storage device may be increased.

Although embodiments according to the inventive concepts of the present disclosure have been explained describing the operation of scheduling m tasks required for the storage controller 210 to generate a command to be provided to the non-volatile memory 220 in response to the command received from the host 100 as an example, the embodiments are not limited to these examples.

In some embodiments, the storage controller 210 may utilize the method described above when scheduling k tasks corresponding to the plurality of commands received from the host 100. For example, when the storage controller 210 schedules the first task for the first read command received from the host 100 and the second task for the second read command received from the host 100, it is possible to schedule the first and second tasks, using the methods described above.

Figure 16:
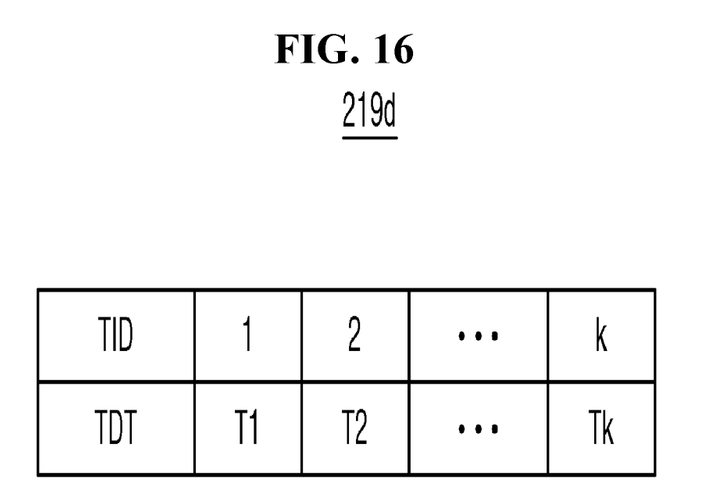
FIG. 16 is a diagram showing the TDT (Task Duration Time) table according to some embodiments.

FIG. 16 is a diagram showing a TDT (Task Duration Time) table according to some embodiments.

Referring to FIGS. 1, 2 and 16, the first task T1 is for processing the first read command received from the host 100, the second task T2 is for processing the second read command received from the host 100, and a $k^{th}$ task Tk is for processing the second read command received from the host 100.

The time required for completing the processing of the first task T1 is T1, the time required for completing the processing of the second task T2 is T2, and the time required for completing the processing of the $k^{th}$ task Tk is Tk.

When the first read command received from the host 100 is for reading the data stored in the first memory cell of the memory cell array 520, and the second read command received from the host 100 for reading the data stored in the second memory cell of the memory cell array 520, T2 which is the time required for completing the processing of the second task T2 may be changed depending on the positions of the first memory cell and the second memory cell.

For example, T2, which is the time required for completing the processing of the second task T2 when the first memory cell and the second memory cell are adjacent to each other in the memory cell array 520, may be smaller than T2 which is the time required for completing the processing of the second task T2 when the first memory cell and the second memory cell are not adjacent to each other, due to locality characteristics.

For example, the processing completion time T1 to Tk of the tasks included in the task execution time table 219*d* may be changed in consideration of whether to perform the internal operation of the non-volatile memory 220, the state of the non-volatile memory 220, the state of the memory interface 212, a relationship between the commands received from the host 100 described above, and the like.

Further, although the tasks generated from different commands received from the host 100 have been described as an example, the processing completion times T1 to Tm of the tasks generated from one command described above referring to FIG. 6 may also be changed in consideration of whether to execute the internal operation of the non-volatile memory 220, the state of the non-volatile memory 220, the state of the memory interface 212, or other considerations.

Accordingly, a memory device and a method of operating the same in accordance with the present disclosure may operate with increased speed and efficiency as a result of the increased utilization of multi-core processors connected thereto. The processes described above are some examples wherein embodiments may efficiently use the multi-core processors in accordance with the inventive concepts.

In concluding the detailed description, those skilled in the art will appreciate that variations and modifications may be made to the disclosed embodiments without substantially departing from the principles of the present disclosure. Therefore, the disclosed embodiments are used in a generic and descriptive sense only and not for purposes of limitation.

What is claimed is:

1. A method of operating a storage device including a non-volatile memory and a multi-core processor including at least two cores, the method comprising:
   receiving, by a host interface of the storage device, a first memory command from a host for requesting the non-volatile memory to perform a predetermined memory operation;
   generating, by a task scheduler of the storage device, first and second tasks from the first memory command;
   selecting, by the task scheduler, a first core from among the at least two cores based on execution times of the at least two cores;
   assigning, by the task scheduler, the first and second tasks to the first core; and
   requesting, by the first core, a subsequent task from the task scheduler while the first core processes the first assigned task and loads code for processing the second task.

2. The method for operating the storage device of claim 1, wherein the storage device further includes a memory interface connected to the non-volatile memory,
   and wherein a second memory command, based at least in part on the first memory command generated after completion of processing of the first and second tasks, is provided to the non-volatile memory through the memory interface.

3. The method for operating the storage device of claim 1, wherein the first memory command includes a read command to reading data of a non-volatile memory cell addressed to a first logical address,
   the first task includes a task of searching a first physical address corresponding to the first logical address, and
   the second task includes a task of determining a read voltage for reading data stored in the non-volatile memory cell addressed to the first physical address.

4. The method for operating the storage device of claim 1, wherein the host interface receives a second memory command different from the first memory command for requesting the non-volatile memory to perform a predetermined memory operation from the host,
   the task scheduler generates a third task from the second memory command,
   the task scheduler checks an execution time of the third task, and reviews execution times of the first core and a second core based on the execution time of the third task to select one of the first core and the second core as a core to which the third task is assigned,
   the first memory command includes a first read command for reading data of a first memory cell among the plurality of non-volatile memory cells,
   the second memory command includes a second read command for reading data of a second memory cell among the plurality of non-volatile memory cells, and
   the execution time of the third task is changed depending on positions of the first memory cell and the second memory cell.

5. The method for operating the storage device of claim 1, wherein the operation of selecting a first core from among the at least two cores includes
   an operation in which the task scheduler checks the execution times of the first and second tasks, and
   an operation in which the task scheduler reviews the execution times of the first core and a second core based on the checked execution times of the first and second tasks, and, upon assigning the first task to the first core, checking the execution times of the first core and the second core to further assign the second task to the first core.

6. The method for operating the storage device of claim 5, further comprising:
   updating the execution time of the first core in consideration of the execution times of the first and second tasks, by the task scheduler.

7. A method for operating a storage device including a non-volatile memory and a multi-core processor including at least two cores, the method comprising:
   receiving, by a host interface of the storage device, a first memory command from a host for requesting the non-volatile memory to perform a predetermined memory operation;
   generating, by a task scheduler of the storage device, a first task and a second task based on the first memory command;
   checking an execution time of the first task by the task scheduler;
   selecting, by the task scheduler, a first core from among the at least two cores having a shortest execution time based on execution times of the at least two cores;
   increasing, by the task scheduler, the execution time of the first core by the execution time of the first task to update the execution times;
   issuing, by the task scheduler the first task to the first core;
   selecting, by the task scheduler, a second core from among the at least two cores having a shortest execution time based on the updated execution times; and
   issuing, by the task scheduler, the second task to the first core when the second task is dependent on the first task and otherwise issuing the second task to the second core.

8. The method for operating the storage device of claim 7, further comprising:
   requesting, by the first core upon finishing processing the issued first task, a subsequent task from the task scheduler; and
   while requesting the task scheduler to assign the subsequent task, loading a code for processing the second task into the first core.

9. The method for operating the storage device of claim 8, further comprising:
   providing a second memory command generated based on the processing of the first and second tasks to the non-volatile memory through a memory interface.

10. The method for operating the storage device of claim 7, wherein the first memory command includes a read command to read data of a non-volatile memory cell addressed to a first logical address, the first task includes a task of searching a first physical address corresponding to the first logical address, and
a second memory command is sent to the non-volatile memory, wherein the second memory command includes a read command for reading data of the non-volatile memory cell addressed to the first physical address.

11. A storage device comprising:
a non-volatile memory including a plurality of non-volatile memory cells;
a host interface configured to receive a first memory command for requesting the non-volatile memory to perform a predetermined memory operation from a host;
a multi-core processor including a plurality of cores;
a task scheduler configured to generate a first task and a second task based on the first memory command, check an execution time of the first task, select a first core among the plurality of cores having a shortest execution time based on execution times of the plurality of cores, increase the execution time of the first core by the execution time of the first task to update the execution times, issue the first task to the first core, select a second core from among the plurality of cores having a shortest execution time based on the updated execution times, and issue the second task to the first core when the second task is dependent on the first task and otherwise issue the second task to the second core.

12. The storage device of claim 11, further comprising:
a memory interface is configured to transmit a toggling write enable signal and a data signal including a second memory command to the non-volatile memory, wherein the second memory command is generated based on a completion of the first and second tasks.

13. The storage device of claim 11, wherein
code for processing the second task is loaded into the first core while the first core requests the task scheduler to assign a subsequent task.

14. The storage device of claim 13, further comprising:
a buffer memory which is configured to temporarily store data to be read from the non-volatile memory,
wherein the code for processing the second task being stored in the buffer memory.

15. The storage device of claim 13, wherein the first memory command includes a read command to read data of a non-volatile memory cell addressed to a first logical address,
the first task includes a task of searching a first physical address corresponding to the first logical address,
the second task includes a task of determining a read voltage for reading data stored in the non-volatile memory cell addressed to the first physical address, and
a second memory command is sent to the non-volatile memory, wherein the second memory command includes a read command to read data of the non-volatile memory cell addressed to the first physical address.

16. The storage device of claim 15, further comprising:
a memory interface configured to transmit a toggling write enable signal and a data signal including a second memory command to the non-volatile memory, wherein the second memory command is generated based on a completion of the first and second tasks.

17. The storage device of claim 11, wherein the first memory command includes a read command to read data of a non-volatile memory cell addressed to a first logical address,
the first task includes a task of searching a first physical address corresponding to the first logical address, and
a second memory command is sent to the non-volatile memory, wherein the second memory command includes a read command to data of the non-volatile memory cell addressed to the first physical address.

18. The storage device of claim 17, further comprising:
a memory interface is configured to transmit a toggling write enable signal and a data signal including a second memory command to the non-volatile memory.

19. The storage device of claim 11, wherein the updating of the execution times includes updating an execution time stamp table using a task execution time table.

* * * * *